United States Patent Office 3,389,279
Patented June 18, 1968

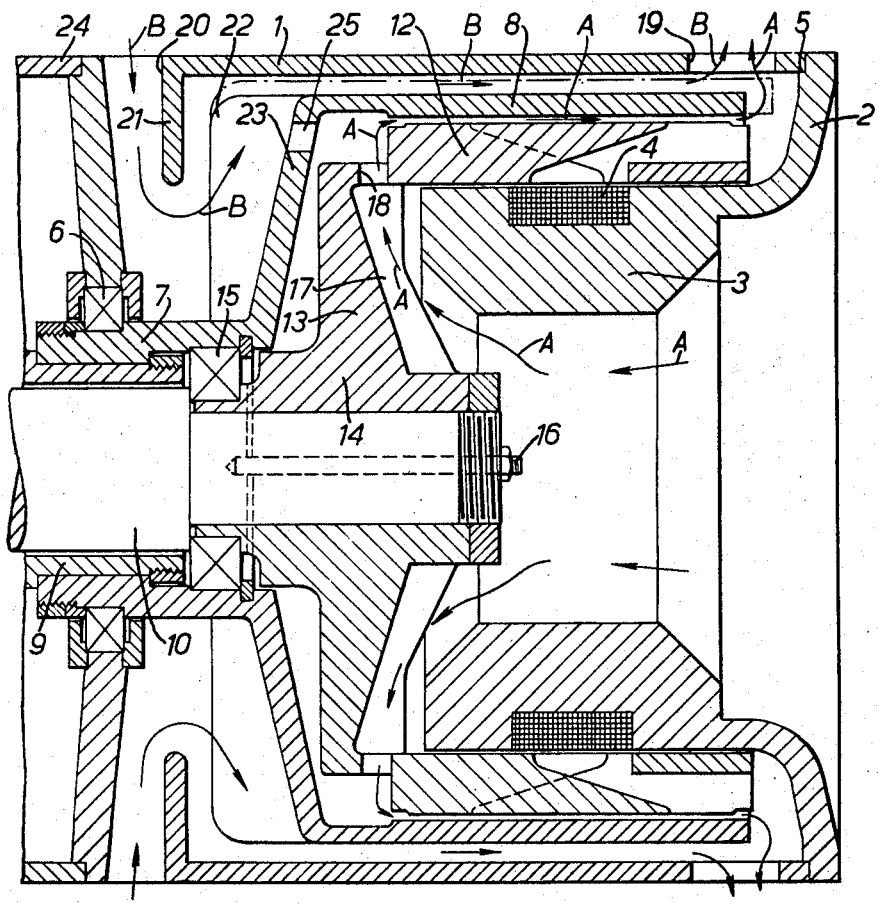

3,389,279
EDDY CURRENT COUPLING
Philip Elliott Herrick, Wotton-under-Edge, Gloucester, England, assignor, by mesne assignments, to The Louis Allis Company, Milwaukee, Wis., a corporation of Delaware
Filed Mar. 23, 1966, Ser. No. 536,873
9 Claims. (Cl. 310—105)

ABSTRACT OF THE DISCLOSURE

An eddy current coupling includes a hollow field coil surrounded by a pole assembly having impeller blades thereon for inducing an airflow through the field coil. Apertures in the pole assembly permit airflow into an annular space between the pole assembly and an inductor drum. A flange of the drum is provided with impeller blades which may extend along the axial portion of the drum. The blades on the flange induce airflow across the axial blades to cool the drum.

This invention relates to eddy current couplings of the type in which two rotatable members are disposed coaxially with respect to and surround a fixed field structure. The field structure embodies an energising winding and the rotatable members are respectively connected to input and output shafts of the coupling.

It is an object of the invention to provide means for cooling such a coupling.

Broadly, the invention provides an eddy current coupling comprising a central field structure, a rotatable unwound pole assembly with alternating magnetic poles of opposite polarity surrounding said central field structure, a rotatable inductor drum surrounding said pole assembly, and means providing an air passage through said central field structure so that in use a flow of ventilating air is induced which passes axially through said central field structure in one direction, then radially outwardly and thereafter axially in the opposite direction between said pole assembly and said inductor drum.

The coupling conveniently employs a quill arrangement of input and output shafts respectively connected to the rotatable members, formed by the pole assembly and inductor drum, with the ventilating air entering the field structure at the end of the coupling remote from the shafts. The pole assembly may be provided with radial flow ventilation apertures disposed between an interdigitated portion of the assembly, providing the alternating poles, and a flange section connected to a central boss or hub by which the assembly is mounted on the inner of the two shafts. The described flow of ventilating air may be at least in part induced by impeller blades formed on or attached to said flange section.

The flow of air initially cools the field structure and later cools the pole assembly, and a further main flow of ventilating air may be induced by impeller blades on a flange section of the inductor drum and which flows axially between the inductor drum and an outer frame or casing of the coupling. The two ventilating air flows may leave through outlet apertures in the frame at the end of the latter remote from the quill shaft arrangement.

The invention will now be further described with reference to the accompanying drawing which illustrates, by way of example, an eddy current coupling in accordance with the invention. The drawing shows the coupling, somewhat diagrammatically, in axial section.

The coupling has an outer frame 1 forming a casing and to one end of which is bolted a mounting flange 2 of a fixed field structure 3 which has the usual D.C. energising winding 4. The field structure 3 is accurately centered within the frame 1 by means of a locating shoulder 5 on the flange 2. The opposite end of the coupling houses a supporting bearing 6 in which is mounted a central boss 7 of a rotatable inductor drum 8 which is disposed coaxially with and surrounds the field structure 3. The boss 7 is mounted and keyed on a hollow quill shaft 9 through which a solid inner shaft 10 passes with radial clearance.

A rotatable pole assembly 12 of interdigitated form provides alternating unwound magnetic poles of opposite polarity and is disposed coaxially with and between the field structure 3 and the inductor drum 8. The interdigitated portion of the pole assembly 12 is mounted on a flange section 13 with a central boss 14 which is keyed on to the inner end of the shaft 10. The boss 14 is supported within the boss 7 by a bearing 15 which is lubricated by way of a grease nipple 16 disposed at the inner end of the shaft 10, and accessible through the hollow field structure 3 and the open end of the coupling remote from the shafts.

The open end of the coupling provides an inlet for a secondary flow of ventilation air which acts to provide very efficient cooling of the field structure 3 and pole assembly 12. This flow of air passes axially in one direction through the field structure as indicated by the arrows A and thereafter flows radially outwards, the flow being induced by impeller blades 17 formed on the inner side of the flange section 13. As shown the air passes radially through apertures such as 18 in the pole assembly, these apertures being disposed between the interdigitated portion thereof and a flange section 13. The air then passes between the pole assembly 12 and the inductor drum 8 to cool these rotatable members, thereafter passing out of the frame 1 through outlet apertures such as 19 adjacent the open end of the frame remote from the shafts 9 and 10.

A main flow of cooling air passes axially within the frame 1 between the latter and the inductor drum 8, as shown by the arrows B, before leaving through the outlets 19. The main flow enters through ventilating inlets 20 at the end of the frame remote from the outlets 19, and immediately on the right-hand side of the inlets 20, as shown in the drawing, there is disposed a radially inwardly projecting wall 21 around which the flow has to pass. The main flow is induced by impeller blades 22 on the outside of the inductor drum.

A ring of holes 25 is provided in the flange 23 between the blades 22, and thus a portion of the main air flow passes through these holes and reinforces the air flow between the inductor drum 8 and pole assembly 12.

If desired the blades 22 on the drum 8 may be extended, as shown in broken lines, along the outer periphery of the drum. This provides a greater effective cooling area, the peripheral blades acting as cooling fins, and also breaks up the air flow past the drum to prevent laminar flow. Alternatively, or additionally, blades may project axially from the free end of the drum 8 remote from the flange 23. This again provides a greater effective cooling area and in addition has a fan effect. As also shown in broken lines, the axially projecting blades may be a continuation of the peripheral blades.

It will be appreciated that the described ventilation flows of cooling air not only provide efficient cooling of the rotatable members and the field structure, but also that the bearing 15 is separated by the flow A from the heat generated in the field structure 3 and that it is also swept by the main ventilation flow B.

The described coupling can conveniently form a unit construction with a driving motor having a casing 24 (as illustrated) or be independently constructed for separate drive and provided with a further supporting bearing. In the former case the hollow outer quill shaft 9 may carry the rotor of the motor, if the coupling is constructed for separate drive the outer shaft 9 may carry a drive pulley. During operation of the coupling relative rotation of the inductor drum 8 and pole assembly 12, when the field structure 3 is energised, results in torque-producing eddy currents. Thus rotation of the outer quill shaft 9 and with it the inductor drum 8 acts to drive the inner shaft 10 through the pole assembly 12.

I claim:

1. An eddy current coupling comprising a central field structure, a rotatable unwound pole assembly with alternating magnetic poles of opposite polarity surrounding said central field structure, a rotatable inductor drum surrounding said pole assembly, and means providing an air passage through said central field structure so that in use a flow of ventilating air is induced which passes axially through said central field structure in one direction, then radially outwardly and thereafter axially in the opposite direction between said pole assembly and said inductor drum.

2. The eddy current coupling set forth in claim 1, including a quill arrangement of input and output shafts respectively connected to the rotatable members formed by said pole assembly and said inductor drum, said air passage including an inlet at the end of said coupling remote from the shafts so that said ventilating air enters said central field structure at said end.

3. The eddy current coupling set forth in claim 2, wherein said pole assembly has an interdigitated portion, a flange section, a central mounting boss connected to said flange section, and means defining flow ventilation apertures disposed between said interdigitated portion and said flange section.

4. The eddy current set forth in claim 3, including impeller blade means on said pole assembly for inducing at least in part said flow of ventilating air.

5. The eddy current coupling set forth in claim 4, wherein said coupling includes an outerframe, said inductor drum has a flange section, and including impeller blade means on said flange section of said inductor drum for inducing a further flow of main ventilating air axially between said inductor drum and said outer frame.

6. The eddy current coupling set forthi n claim 5, wherein said impeller blade means on said inductor drum extend along the outer periphery thereof.

7. The eddy current coupling set forth in claim 6, wherein axially projecting blades extend from the end of said inductor drum remote from said flange section thereof.

8. The eddy current coupling set forth in claim 7, including means defining outlet apertures in said frame adjacent one end thereof for conveying said two ventilating air flows away from the frame.

9. The eddy current coupling set forth in claim 8, including a bearing by which said pole assembly is supported within said inductor drum, and a housing of said bearing, said bearing being separated from said central field structure by said first-mentioned ventilating flow and said bearing housing also being swept by said main ventilating flow.

References Cited

UNITED STATES PATENTS

| | | | |
|---|---|---|---|
| 2,605,313 | 7/1952 | Sadler | 310—96 |
| 3,020,427 | 2/1962 | Wheeler et al. | 310—105 |
| 3,056,895 | 10/1962 | Cohen et al. | 310—105 X |
| 3,167,674 | 1/1965 | Woodward | 310—105 |

ROBERT K. SCHAEFER, *Primary Examiner.*

H. O. JONES, *Assistant Examiner.*